United States Patent Office 3,476,726
Patented Nov. 4, 1969

3,476,726
HOMOPOLYMERS AND COPOLYMERS OF UNSATURATED TERTIARY AMINES, AND PROCESS FOR PRODUCING THE SAME
Umberto Giannini and Germana Bruckner, Milan, Italy, assignors to Montecatini Edison S.p.A., Milan, Italy
No Drawing. Filed Nov. 28, 1966, Ser. No. 597,215
Claims priority, application Italy, Nov. 29, 1965, 26,453/65
Int. Cl. C08f *3/86, 1/28*
U.S. Cl. 260—89.7     5 Claims This invention relates to high molecular weight, linear head-to-tail homopolymers of unsaturated tertiary amines which may be characterized by steric regularity, and to copolymers of the unsaturated tertiary amines with olefins.

It is known that olefins are polymerized to high polymer yields by means of catalysts prepared from compounds of transition metals of Groups IV, V and VI of the Mendeleef Periodic Table and organometallic compounds of metals of Groups I, II and III of said table.

It is also known that the polymerization of olefins with these catalysts is inhibited by the addition to the catalytic system of high amounts of nitrogen-containing compounds which, due to the presence therein of free electron pairs, can behave like Lewis bases and form complexes with the catalyst components.

An object of the invention is to provide homopolymers and copolymers of certain unsaturated tertiary amines containing one vinyl double bond and a process for producing the same wherein the homopolymerization or copolymerization is effected by means of catalysts prepared from compounds of transition metals belonging to Groups IV, V and VI of the Mendeleef Periodic Table and organometallic or metal hydride derivatives of metals belonging to Groups I, II and III of said table.

The unsaturated tertiary amines which can be homopolymerized or copolymerized with olefins in accordance with this invention have the general formula (A) 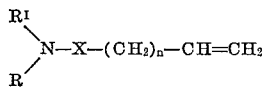

wherein X is a methylenic, arylenic (having 6 to 10 C atoms) or cycloalkenylenic radical (having 3 to 10 C atoms); R is equal or different from $R^I$, each one representing a branched alkyl, a cycloalkyl or alkylaryl radical, containing 3 to 10 C atoms.

In Formula A, $n$ equals 0 to 10 when X is an arylenic or cycloalkenylenic radical or when the tertiary amine is copolymerized with olefins, and equals 1 to 10 when X is a methylenic radical and the tertiary amine is homopolymerized.

Neither high molecular weight homopolymers of unsaturated tertiary amines of Formula A, nor copolymers thereof with olefins have been described heretofore.

Specific unsaturated amines which can be homopolymerized or copolymerized with olefins in accordance with this invention include the following:

(5) N,N-diisopropylamino-(1)-pentene,
(4) N,N-diisopropylamino-(1)-butene,
(11) N,N-diisopropylamino-(1)-undecene,
(11) N,N-dicyclohexylamino-(1)-undecene,
(11) (N-cyclohexyl, N-isopropylamino)-(1)-undecene,
   p. diisopropylaminostyrene
   p. diisopropylamino-allylbenzene
(1) N,N-diisopropylamino-(4)-allylcyclohexane.

Although the results obtained by homopolymerizing or copolymerizing the unsaturated tertiary amines as described herein are always satisfactory, the best results are obtained using amines of Formula A in which R represents bulky groups which hinder complexing of the nitrogen atom with the catalyst components.

The olefins which can be copolymerized with the unsaturated amines of Formula A, in accordance with this invention have the general formula $$CH_2=CH-R'$$

in which R' is a hydrogen atom or an alkyl, aryl, cycloalkyl, alkylaryl or alkylcycloalkyl group containing 1 to 10 C atoms. Examples of such olefins are: ethylene, propylene, butene-1, 3-methylbutene-1, 4-methylpentene-1, 5-phenylpentene-1, allylcyclohexane and styrene.

Illustrative transition metal compounds which can be used as one catalyst-forming component include $TiCl_3$ (obtained by reduction of $TiCl_4$ with aluminum or hydrogen, and activated), $TiCl_4$, $VCl_4$, $VOCl_3$, $CrCl_3$, $$TiCl_2(OC_4H_9)_2$$

$VCl_3$, $VO(OC_2H_5)_3$ and vanadium triacetylacetonate.

Examples of organometallic or metalhydride compounds which may be used in preparing the catalyst are:
$LiC_4H_9$, $Al(C_2H_5)_3$, $Al(i-C_4H_9)_3$, $Al(i-C_6H_{13})_2Cl$, $$Al(C_2H_5)_2Cl$$

$Al(i-C_4H_9)_2Cl$, $Be(C_2H_5)_2$, $Al(C_6H_5)_3$, $Al(i-C_4H_9)_2Br$, $Al(i-C_6H_{13})_3$, $Al(i-C_4H_9)_2H$, $Al(C_2H_5)_2OC_2H_5$, $$Al(Cl)(C_2H_5)OC_2H_5$$

$LiAl(C_4H_9)_4$, $LiAl(C_4H_9)_3H$, $LiH$, $C_6H_5MgBr$, $$(C_4H_9)_2Mg$$

$C_4H_9Mg(OC_3H_7)$.

Superior results are obtained by using, as one catalyst-forming component, organometallic compounds in which the group (or groups) bound to the metal atom has (have) sufficient bulk to hinder complexing with the nitrogen atom of the amine.

Catalysts prepared from $TiCl_3$ or $VCl_3$ and $$Al(i-C_4H_9)_2Cl$$

$Al(i-C_6H_{13})_2Cl$, or $Al(i-C_6H_{13})_3$, are particularly active.

The polymerization is carried out in a dry inert gas atmosphere and, preferably, in the presence of diluent medium which does not react with the catalyst. Aliphatic, alicyclic and aromatic hydrocarbons, as well as chlorobenzene or dichloroethylene are suitable diluent media.

In general, the polymerization is effected at a temperature between −30° C. and 150° C. Preferably, the polymerization temperature is from 30° C. to 80° C.

The homopolymerization of (5)-N,N-diisopropylamino-(1)-pentene in accordance with this invention yields a high molecular weight homopolymer which consists of an amorphous, acetone-soluble portion having a rubbery appearance, and an acetone-insoluble portion which is highly crystalline when subjected to X-ray examination and which gives a powder spectrum (Cu K-alpha) showing the most intense reflections at $2\theta$ angles of 6.2°, 8.5°, and 16.3°.

The polymer can be extruded into filaments which, after a short annealing at about 100° C., give spectra of oriented fibers on X-ray examination. The crystallinity of the poly (5)-N,N-diisopropylamino-(1)-pentene disappears at temperatures between 120° C. and 130° C.

The crystalline polymer of (5) N,N-diisopropylamino-(1)-pentene is insoluble in water, alcohols, ketones and ethyl acetate; it is soluble in ether, aliphatic and aromatic hydrocarbon solvents, and in chlorinated hydrocarbon solvents.

Some typical copolymers which have been prepared in accordance with this invention are:

copolymers of (5) N,N-diisopropylamino-(1)-pentene with propylene and 4-methylpentene-1;

copolymers of (4) N,N-diisopropylamino (1)-butene with 4-methylpentene-1;

copolymers of (3) N,N-diisopropylamino-(1)-propene with propylene;

copolymers of (5) N,N,-diisobutylamino-(1)-pentene with 4-methylpentene-1;

copolymers of (7) N,N-diisopropylamino-(1)-heptene with 4-methylpentene-1.

These copolymers still contain nitrogen after extraction thereof with ethyl ether, a good solvent for the homopolymers of the amine, showing that the products are true copolymers.

Both the homopolymers and the copolymers of this invention are thermoplastic and can be molded by die-casting, injection, or extrusion processes.

The textile fibers obtained by extruding a molten mass of the homopolymers or copolymers of the invention and then stretching the extrudate have the characteristics of a base, due to the presence of nitrogen therein, and can be easily dyed with acid dyestuffs.

The following examples are given to illustrate the invention and are not intended to be limiting.

Example 1

35 cc. of anhydrous benzene, 40 millimols of (5) N,N-diisopropylamino-(1)-pentene, 3.82 millimols of titanium trichloride (obtained by reduction of $TiCl_4$ with aluminum and activated) and 15.3 millimols of $Al(i-C_4H_9)_2Cl$ are introduced under nitrogen into a 100 cc. flask.

The reaction mixture is kept in agitation for 3 days at 50° C.

The reaction product is then dissolved in a 5% hydrochloric acid solution in methanol.

The solution thus obtained is alkalinized with an aqueous NaOH solution and the precipitate thus separated is extracted with benzene. By evaporation of the benzene extract, there are obtained 2.2 g. of a solid polymer, 28% of which is soluble in boiling acetone.

While the polymer soluble in acetone appears to be amorphous by X-ray examination, the fraction insoluble in acetone appears to be highly crystalline by X-ray examination and gives a powder spectrum, recorded by means of the Geiger counter (Cu-K alpha), which shows the most intense reflections for $2\theta$ angles of 6.2°, 8.5° and 16.3°.

The crystalline polymer is insoluble in water, alcohols, ketones and ethylacetate; it is soluble in aliphatic and aromatic hydrocarbons, ethers and chlorinated solvents.

The polymer insoluble in acetone has an intrinsic viscosity, determined in benzene at 30° C., of 1.79 (100 cc./g.).

Example 2

35 cc. of anhydrous benzene, 40 millimols of (4) N,N-diisopropylamine-(1)-butene, 3.38 millimols of titanium trichloride (obtained by reduction of $TiCl_4$ with aluminum and activated) and 13.5 millimols of $Al(i-C_4H_9)_2Cl$ are introduced under nitrogen into a 100 cc. flask.

The reaction mixture is then kept in agitation for 4 days at 60° C. By operating as described in Example 1, 2.15 g. of a polymer 80% of which is soluble in hot acetone are isolated.

The polymer soluble in acetone appears to be amorphorus by X-ray examination while the fraction insoluble in acetone appears to by crystalline by X-ray examination and gives a spectrum of polymers (Cu-K alpha) which shows the most intense reflections for $2\theta$ angles of 14.0°; 15.5°; 16.5°; 19.2°; 22.3°; and 25.0°. The polymer insoluble in acetone has an intrinsic viscosity of 1.0 (100 cc./g.) determined in benzene at 30° C.

The melting point of the polymer under nitrogen, determined by means of the polarizing microscope, is comprised between 315° C. and 320° C.

Example 3

35 cc. of anhydrous benzene, 40 millimols of (5) N,N-diisopropylamino-(1)-pentene, 2.23 millimols of titanium trichloride (obtained by reduction of $TiCl_4$ with aluminum and activated) and 13 millimols of $Al(C_2H_5)_2Cl$ are introduced under nitrogen into a 100 cc. flask.

The reaction mixture is then kept in agitation for 4 days at 60° C.

By operating as described in Example 1, 1.28 g. of a polymer which is insoluble for 40% in boiling acetone are isolated.

The polymer insoluble in boiling acetone appears to be highly crystalline by X-ray examination and has an intrinsic viscosity, determined in benzene at 30° C., of 1.5 (100 cc./g.).

Example 4

3.83 millimols of titanium trichloride obtained by reduction of $TiCl_4$ with aluminum and activated, 15.3 millimols of $Al(i-C_4H_9)_2Cl$, 40 millimols of (5) N,N-diisopropylamino-(1)-pentene, 100 cc. of anhydrous benzene and propylene up to a pressure of 3 atm. are introduced under nitrogen into a shaking autoclave having a capacity of 250 cc., heated to 60° C.

The temperature and pressure are kept constant for two hours; the polymerization is then stopped by decomposing the catalyst with a solution of hydrochloric acid in methanol.

15.4 g. of a white powdery polymer which appears to contain 0.25% of N are isolated. Only 9% of the polymer is soluble in boiling ethyl ether.

The ether extract contains 0.35% of nitrogen. The residue after ether extraction contains 0.23% of nitrogen and, by X-ray examination, shows a high crystallinity of isotactic type and has an intrinsic viscosity in tetrahydronaphthalene at 135° C. of 3.03 (100 cc./g.).

Example 5

3.17 millimols of titanium trichloride, obtained by reduction of $TiCl_4$ with aluminum and activated, 12.7 millimols of $Al(C_2H_5)_2Cl$, 120 millimols of 4-methylpentene-1, 40 millimols of (5) N,N-diisopropylamino-(1)-pentene and 50 cc. of anhydrous benzene are introduced into a 150 cc. pressure vessel under nitrogen atmosphere.

The reaction mixture is kept in agitation for 15 hours at 70° C. The reaction product is then treated with a 5% solution of hydrochloric acid in methanol.

The insoluble polymer (1) is filtered, washed with an aqueous alkaline solution and dried.

The acid methanol solution is neutralized with an aqueous NaOH solution and extracted with benzene. By evaporation of the benzene extract, further polymer is obtained and added to (1).

A total of 12.04 g. of polymer are obtained.

41.5% of the polymer is extracted by ethyl ether. The ether extract has a nitrogen content of 0.38%.

9% of the polymer is soluble in boiling benzene; the benzene extract has a nitrogen content of 0.93%.

The residue after benzene extraction, amounting to 49.5% of the total crude polymer, has a nitrogen content of 1.55%, shows a high crystallinity by X-ray examination and has an intrinsic viscosity, determined in tetrahydronaphthalene at 135° C., of 2.5 (100 cc./g.).

Example 6

0.53 g. of titanium trichloride (obtained by reduction of $TiCl_4$ with Al and activated), 50 cc. of anhydrous benzene, 13.7 millimols of $Al(C_2H_5)_2Cl$ and a mixture of 120 millimols of 4-methylpentene-1 and 40 millimols of (4) N,N-diisopropylamino-(1)-butene are introduced in that order into a 100 cc. flask under a nitrogen atmosphere.

The reaction mixture is kept in agitation for 6 hours at 70° C. The copolymerization is then stopped and the copolymer is isolated as described in Example 5 to obtain 2.72 g. of polymer of which only 4.8% is soluble in boiling acetone.

The residue after extraction with acetone has a nitrogen content of 0.58%.

Example 7

2.6 millimols of titanium trichloride (obtained by reduction of $TiCl_4$ with aluminum and activated), 10.4 millimols of $Al(i-C_4H_9)_2Cl$, 40 millimols of (3) N,N-diisopropylamino-(1)-propene, 100 cc. of anhydrous benzene and propylene up to the pressure of 2 atm. are introduced under nitrogen atmosphere into a shaking autoclave having the capacity of 250 cc. and heated to 60° C.

The temperature and pressure are kept constant for 2 hours, the polymerization is then stopped by decomposing the catalyst with a solution of hydrochloric acid in methanol. 9.03 g. of a white powdery polymer are isolated.

Only 3.9% of the polymer is soluble in boiling ethyl ether.

The ether extract contains 0.52% of nitrogen. The residue after ether extraction contains 0.1% of nitrogen and shows a high crystallinity by X-ray examination.

Example 8

35 cc. of anhydrous benzene, 3.25 millimols of titanium trichloride (obtained by reduction of $TiCl_4$ with aluminum and activated), 13 millimols of aluminum diisohexylmonochloride and 40 millimols of (5) N,N-diisobutylamino-(1)-pentene are introduced under nitrogen into a 100 cc. three-necked flask.

The reaction mixture is kept in agitation for 22 hours at 60° C. By operating as described in Example 1, 5.22 g. of polymer of which only 8.5% is soluble in boiling acetone are isolated.

The polymer soluble in acetone appears to be amorphous by X-ray examination while the fraction insoluble in acetone appears to be crystalline by X-ray examination and gives a powder spectrum (Cu-K-alpha) which shows the most intense reflections for angles $2\theta$ of 6.2°, 8.6°, 12.3°, 14.9°, 18°, 20°, and 21.7°.

The crystalline polymer is insoluble in water, alcohols, acetone and ethyl acetate; it is soluble in aliphatic and aromatic hydrocarbons, ethers and chlorinated solvents.

The temperature at which the crystallinity disappears is comprised between 110° C. and 115° C.

The polymer insoluble in acetone has an intrinsic viscosity, determined in benzene at 35° C., of 1.28.

Example 9

35 cc. of anhydrous benzene, 2.5 millimols of titanium trichloride (obtained by reduction of $TiCl_4$ with Al and activated), 14 millimols of aluminum triisohexyl and 40 millimols of (7) N,N-diisopropylamino-(1)-heptene are introduced under nitrogen into a 100 cc. flask.

The reaction mixture is kept in agitation for 26 hours at 60° C.

By operating as described in Example 1, there are isolated 8.76 g. of a tacky polymer which appears to be amorphous by X-ray examination. 14.9% of the polymer is soluble in boiling acetone. The residue after acetone extraction, which is insoluble in water and alcohols and is soluble in aliphatic and aromatic hydrocarbons and in ethers and chlorinated solvents, has an intrinsic viscosity, determined in benzene at 35° C., of 0.64.

Example 10

3.25 millimols of titanium trichloride (obtained by reduction of $TiCl_4$ with aluminum and activated), 13 millimols of aluminum diisohexyl monochloride, 35 cc. of anhydrous benzene and 40 millimols of (11) N,N-diisopropylamino-(1)-undecene are introduced under nitrogen into a 100 cc. flask.

The reaction mixture is kept in agitation for 15 hours at 60° C. By operating as described in Example 1, there are isolated 9.58 g. of a semisolid tacky polymer, 32% of which is soluble in boiling acetone.

The residue after acetone extraction appears to be amorphous by X-ray examination and has an intrinsic viscosity of 0.65 (determined in toluene at 30° C.).

Example 11

3.3 millimols of titanium trichloride (obtained by reduction of $TiCl_4$ with aluminum and activated), 13.2 millimols of $Al(i-C_6H_{13})_2Cl$, 35 cc. of anhydrous benzene and 40 millimols of (5) N,N-diisopropylamino-(1)-pentene are introduced under nitrogen into a 100 cc. flask.

The reaction mixture is kept in agitation for 14 hours at 60° C. By following the method of Example 1, 6.8 g. of polymer, 93% of which is insoluble in boiling acetone, are then isolated. The residue after acetone extraction, which is highly crystalline by X-ray examination, has an intrinsic viscosity, determined in toluene at 30° C., of 1.95.

Example 12

17 cc. of anhydrous benzene, 1.75 millimols of titanium trichloride (obtained by reduction of $TiCl_4$ with $H_2$ and activated), 7.02 millimols of $Al(i-C_6H_{13})_3$ and 20 millimols of (5) N,N-diisopropylamino-(1)-pentene are introduced under nitrogen into a 50 cc. flask.

The reaction mixture is kept in agitation for 15 hours at 60° C. By operating as described in Example 1, 0.6 g. of a polymer, 20% of which is insoluble in boiling acetone, are isolated.

The residue after acetone extraction, which is highly crystalline by X-ray examination, has an intrinsic viscosity, determined in toluene at 30° C., of 1.5.

Example 13

2.8 millimols of vanadium trichloride, 35 cc. of anhydrous benzene, 10.8 millimols of aluminum triisohexyl and 40 millimols of (5) N,N-diisoproplamino-(1)-pentene are introduced under nitrogen into a 100 cc. flask.

The reaction mixture is kept in agitation for 110 hours at 75° C. By operating as described in Example 1, 2 g. of a polymer, 20% of which is insoluble in boiling acetone, are isolated.

The residue after acetone extraction appears to be crystalline by X-ray examination and has an intrinsic viscosity in toluene at 30° C. of 1.2.

Example 14

20 cc. of n-heptane and 6 millimols of aluminum triisohexyl are introduced under nitrogen into a 100 cc. flask.

At room temperature a solution of 3 millimols of $VCl_4$ in 15 cc. of n-heptane is added dropwise and immediately thereafter 40 millimols of (5) N,N-diisopropylamino-(1)-pentene are introduced.

The reaction mixture is then agitated at 50° C. for 22 hours. By operating as described in Example 1, 0.5 g. of a polymer, 20% of which is insoluble in boiling acetone are isolated.

The residue after acetone extraction appears to be crystalline by X-ray examination and has an intrinsic viscosity, determined in toluene at 30° C. of 1.1.

Example 15

By operating under the conditions described in Example 14, but using $VOCl_3$ instead of $VCl_4$, 0.4 g. of polymer, 18% of which is insoluble in boiling acetone, are obtained. The residue after acetone extraction appears to be crystalline by X-ray examination and has an intrinsic viscosity, determined in toluene at 30° C., of 1.05.

Example 16

35 cc. of anhydrous benzene, 3.41 millimols of titanium trichloride (obtained by reduction of $TiCl_4$ with Al and activated), 13.25 millimols of aluminum triisohexyl and 40 millimols of (5) N,N-diisopropylamino-(1)-pentene are introduced under nitrogen into a 100 cc. flask.

The reaction mixture is agitated at 60° C. for 23 hours.

5.1 g. of polymer, 80% of which is insoluble in boiling acetone, are isolated as described in Example 1.

The polymer insoluble in acetone appears to be crystalline by X-ray examination and has an intrinsic viscosity in toluene at 30° C. of 1.15.

Example 17

3.31 millimols of titanium trichloride (obtained by reduction of TiCl$_4$ with aluminum and activated), 60 cc. of anhydrous n-heptane and 9.94 millimols of

are introduced under nitrogen in to a 250 cc. flask.

A mixture of 120 millimols of 4-methyl-pentene-1 and 40 millimols of (5) N,N-diisobutylamino-(1)-pentene is then quickly introduced into the flask heated to 60° C.

The reaction mixture is agitated at 60° C. for 21 hours.

The reaction product is then treated with a 5% solution of hydrochloric acid in methanol.

The insoluble polymer is filtered, washed first with methanol and then with an aqueous alkaline solution and finally dried.

9.6 g. of a polymer, 24% of which is soluble in boiling ethyl ether, are obtained.

The ether extract has a nitrogen content of 0.9%. The residue after ether extraction shows a high crystallinity of isotactic poly-4-methyl-pentene-1 and has a nitrogen content of 0.42%.

Example 18

50 cc. of anhydrous benzene, 3.56 millimols of titanium trichloride (obtained by reduction of TiCl$_4$ with Al and activated), 14.25 millimols of Al(C$_2$H$_5$)$_2$Cl, 120 millimols of 4-methylpentene-1 and 40 millimols of (7) N,N-diisopropylamino-(1)-heptane are introduced into a 250 cc. flask under nitrogen.

The reaction mixture is agitated for 20 hours at 70° C.

6.76 g. of polymer, of which 32% is soluble in boiling ethyl ether, are isolated as described in Example 17.

The ether extract has a nitrogen content of 1.66% and an intrinsic viscosity, determined in tetrahydronaphthalene at 135° C., of 1.68.

Example 19

100 cc. of anhydrous benzene, 3.24 millimols of titanium trichloride (obtained by reduction of TiCl$_4$ with Al and activated), 12.9 millimols of Al(C$_2$H$_5$)$_2$Cl, 40 millimols of (7) N,N-diisopropylamino-(1)-heptene and propylene up to a pressure of 3 atm. are introduced under nitrogen into a 500 cc. shaking autoclave to 65° C.

The temperature and the propylene pressure are kept constant for 2 hours and the polymerization is then stopped.

23.8 g. of polymer are isolated as described in Example 4. 27% of the polymer is soluble in boiling n-heptane. The heptane extract contains 0.23% of nitrogen.

The residue after heptane extraction contains 0.27% of nitrogen, shows a high crystallinity of isotactic polypropylene by X-ray examination and has an intrinsic viscosity, determined in tetrahydronaphthalene at 135° C., of 3.67.

Example 20

90 cc. of anhydrous n-heptane, 8 millimols of aluminum trihexyl and 20 millimols of (7) N,N-diisopropylamino-(1)-heptene are introduced under nitrogen into a 250 cc. flask.

After heating to 50° C., an ethylene current is bubbled through the solution at the flow-rate of 20 l./h. and a solution of 2 millimols of VCl$_4$ in 10 cc. of n-heptane is added dropwise while agitating.

After 30 minutes the polymerization is stopped and 12 g. of polymer are isolated as described in Example 17. 3% of the polymer is soluble in boiling n-heptane and has a nitrogen content of 1.6%.

The polymer insoluble in n-heptane shows a high crystallinity from polyethylene by X-ray examination and has a nitrogen content of 0.36%.

Example 21

50 cc. of anhydrous benzene, 2.72 millimols of titanium trichloride (obtained by reduction of TiCl$_4$ with Al and activated), 10 millimols of Al(C$_2$H$_5$)$_3$, 120 millimols of styrene and 40 millimols of (5) N,N-diisopropylamino-(1)-pentene are introduced under nitrogen into a 100 cc. flask.

The reaction mixture is heated to 60° C. for 2 hours.

The polymerization is then stopped and 0.6 g. of a powdery solid product are isolated as described in Example 4.

The polymer shows a high crystallinity from polystyrene by X-ray examination, has a nitrogen content of 0.14% and an intrinsic viscosity, in tetrahydronaphthalene at 135° C., of 3.42.

Example 22

100 cc. of anhydrous benzene, 3.58 millimols of titanium trichloride (obtained by reduction of TiCl$_4$ with Al and activated), 14.3 millimols of aluminum diisohexyl monochloride and 31.6 millimols of (11) N,N-diisopropylamino-(1)-undecene are introduced under nitrogen into a 500 cc. shaking autoclave heated to 55° C.

Propylene is then introduced up to a pressure of 3 atm. and the temperature and propylene pressure are kept constant for 2 hours.

The polymerization is then stopped and 15.6 g. of polymer having a nitrogen content of 0.1% and an intrinsic viscosity, determined in tetrahydronaphthalene at 135° C., of 1.5 are isolated as described in Example 17.

Example 23

35 cc. of anhydrous benzene, 3.5 millimols of titanium trichloride (obtained by reduction of TiCl$_4$ with Al and activated), 14 millimols of aluminum diisohexylmonochloride and 40 millimols of (5) N,N-dicyclohexylamino-(1)-pentene are introduced under nitrogen into a 100 cc. flask.

The reaction mixture is kept in agitation for 90 hours at 60° C. By operating as described in Example 1, there are isolated 4.35 g. of polymer which appears to be amorphous by X-ray examination. 70% of the polymer is soluble in boiling acetone. The residue after acetone extraction has an intrinsic viscosity, determined in benzene at 35° C., of 0.1 (100 cc./g.).

In the examples referring to crystallinity from isotactic polymers of the olefin copolymerized with the amine, what is meant is that the copolymer shows crystallinity resulting from sequences of propylene or other higher alpha-olefin units which have an isotactic configuration of the tertiary carbon atoms of successive olefin units making up such sequences.

In the examples referring to TiCl$_3$ as being "activated," the activation is accomplished by grinding.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

We claim:

1. Poly-(5) N,N-diisopropylamino-(1)-pentene characterized in having a powder spectrum (Cu-K-alpha) which shows the most intense reflections for angle 2θ of 6.2°, 8.5° and 16.3°.

2. Poly-(4) N,N-diisopropylamino-(1)-butene characterized in having a powder spectrum (Cu-K-alpha) which shows the most intense reflections for angle 2θ of 14.0°; 15.5°; 16.5°; 19.2°; 22.3° and 25.0°.

3. Linear, head-to-head, high molecular weight poly-(7) N,N-diisopropylamino-(1)-heptene.

4. Linear, head-to-tail, high molecular weight poly-(11) N,N-diisopropylamino-(1)-undecene.

5. Linear, head-to-tail, high molecular weight amorphous poly-(5) N,N-diisopropylamino-(1)-pentene.

References Cited

UNITED STATES PATENTS 3,293,326   12/1966   Jezl _____ 260—88.1

JOSEPH L. SCHOFER, Primary Examiner

ROGER S. BENJAMIN, Assistant Examiner

U.S. Cl. X.R.

260—80.73